United States Patent [19]

Ohmura et al.

[11] Patent Number: 5,235,364
[45] Date of Patent: Aug. 10, 1993

[54] LENS-FITTED PHOTOGRAPHIC FILM PACKAGE WITH FLASH UNIT

[75] Inventors: Hiroshi Ohmura, Tokyo; Junichi Takagi, Saitama, both of Japan

[73] Assignee: Fuji Photo Film Co., Ltd., Kanagawa, Japan

[21] Appl. No.: 868,502

[22] Filed: Apr. 15, 1992

[30] Foreign Application Priority Data

Apr. 15, 1991 [JP] Japan ................................ 3-33937

[51] Int. Cl.⁵ .............................................. G03B 15/03
[52] U.S. Cl. .............................................. 354/149.11
[58] Field of Search ................... 354/126, 129, 145.1, 354/147, 149.1, 149.11, 288

[56] References Cited

U.S. PATENT DOCUMENTS 4,148,573  4/1979  Yamanaka ........................... 354/145

FOREIGN PATENT DOCUMENTS 2-34688  9/1990  Japan.

Primary Examiner—Michael L. Gellner
Assistant Examiner—Howard B. Blankenship
Attorney, Agent, or Firm—Young & Thompson

[57] ABSTRACT

A lens-fitted photographic film package with a flash unit, wherein a main capacitor of the flash unit is disposed above a film roll chamber and lies parallel to the film transporting direction. A battery is disposed between the film roll chamber and a cassette chamber, below the taking lens, and also lies parallel to the film transporting direction. The battery is entirely masked when the film package has been assembled. A printed circuit board of the flash unit is substantially rectangular and has a cut-out at the upper right corner thereof in which is mounted a light projector of the flash unit.

13 Claims, 4 Drawing Sheets

LENS-FITTED PHOTOGRAPHIC FILM PACKAGE WITH FLASH UNIT

BACKGROUND OF THE INVENTION

1. Field of the Invention

The present invention relates to a lens-fitted photographic film package with flash unit, and more particularly to a compact arrangement of a flash unit in a lens-fitted photographic film package.

2. Related Art

Lens-fitted photographic film packages (hereinafter referred to as film packages) are now on the market, for example, under a trademark "Quick Snap", which are a single-use camera pre-loaded with photographic film. These film packages make it possible to take pictures whenever desired without buying or carrying an expensive and heavy camera. Because the film package can take pictures of sufficient quality in spite of its low cost, various types of film packages, such as film packages with flash units, film packages for telephotography, and so forth, have been provided and marketed. For example, a film package with flash unit as disclosed in Japanese Utility Model Publ. No. 2-34688, is provided with an AA-type battery for charging the flash unit, which is a relatively large electrical unit. As shown in FIG. 5 of the accompanying drawings, in the above-mentioned known film package with flash unit, the battery 10 is disposed between a film cassette chamber 11 and a film roll chamber 12 below a taking lens 13. The lengthwise direction of the battery 10 is horizontal, that is, parallel to the film transport direction. A main capacitor 14 of the flash unit is disposed on the right side of the film roll chamber, oriented vertically to the film transport direction.

A flash circuit board 15 has a plurality of cut-outs, including a cut-out 15a for mounting a light projector of the flash unit, as shown in FIG. 5. A cut-out formed in the upper and left corner provides space for a viewfinder, and a cut-out formed in the lower and left corner provides space for the battery 10, since the spacing between the cassette chamber 11 and the film roll chamber 12 is minimized so as to make the horizontal length of the film package as short as possible.

Nevertheless, because the main capacitor 14 is also a relatively large electrical unit, the conventional arrangement of the main capacitor 14 increases the horizontal length of the film package by an amount necessary for providing the space for the main capacitor 14 on the right side of the film roll chamber 12. Therefore, it is desirable to improve the compactness of such a film package with flash unit.

Moreover, because the battery 10 is accommodated in such a way that a photofinisher can easily remove the battery 10 from the film package, it is possible that a customer may remove the battery 10 before forwarding the film package to the photofinisher. However, for environmental protection and the recycling of industrial waste, it is desirable to recover the battery 10, the relatively expensive flash circuit board 15, and the film package body as well. Therefore, the removal of the battery 10 should be made difficult.

SUMMARY OF THE INVENTION

In view of the foregoing, an object of the present invention is to provide a compact film package with flash unit.

Another object of the present invention is to provide a film package with flash unit, a flash circuit board of which is simple in shape.

A further object of the present invention is to provide a film package with flash unit, from which the battery is not easily removable.

To achieve the above and other objects, the present invention provides a film package wherein a main capacitor is disposed above a film roll chamber and lies in a horizontal direction, that is, parallel to the film transporting direction. A battery is disposed between a film roll chamber and a cassette chamber below a taking lens system, and also lies parallel to the film transporting direction.

The film package with flash unit according to the present invention is very compact compared with such a film package wherein the main capacitor is disposed vertically on the right side of the film roll chamber.

According to a preferred embodiment of the present invention, because the flash circuit board is substantially rectangular, a large number of substrates for the flash circuit boards can be effectively made from one sheet of base substrate of a constant size. Thereby, the cost of the substrate will be reduced. Moreover, so as to make the removal of the battery difficult, the battery is entirely masked by a front cover section and a rear cover section. According to this embodiment, the battery cannot be removed unless the front cover section is detached from a main body section having the film roll chamber and the cassette chamber. As a result, the recovery of the batteries together with the package bodies is ensured.

BRIEF DESCRIPTION OF THE DRAWINGS

The above and other objects and advantages of the present invention will become apparent from the following detailed description of the preferred embodiments when read in connection with the accompanying drawings, wherein like reference numerals designate like parts throughout the several views, and wherein.

DETAILED DESCRIPTION OF THE PREFERRED EMBODIMENTS

Figure 1:
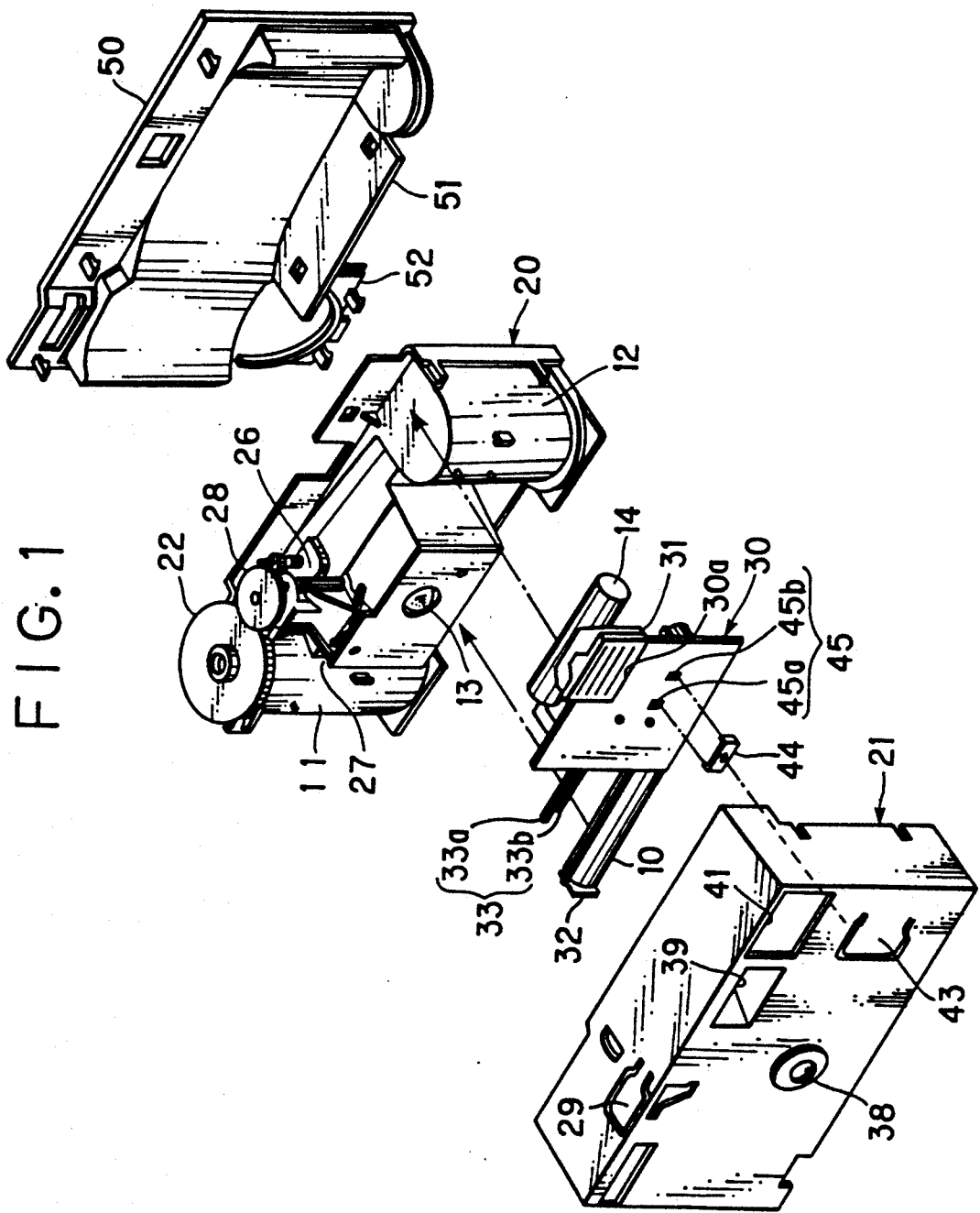
FIG. 1 is an exploded perspective view of a film package having a flash unit according to an embodiment of the present invention.

Referring to FIG. 1, a package body of a film package includes a main body section 20 and a front cover section 21. The structure of the main body section 20 and the front cover section 21 may be as disclosed in U.S. patent application Ser. No. 07/667,758 or Japanese Utility Model Publ. No. 2-34688.

Figure 4:
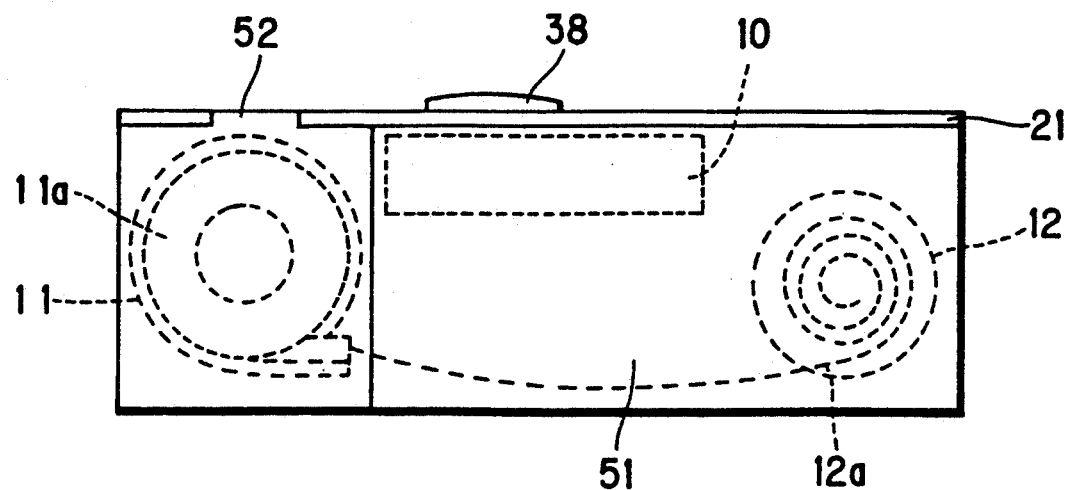
FIG. 4 is a bottom plan view of the film package.
Figure 5:
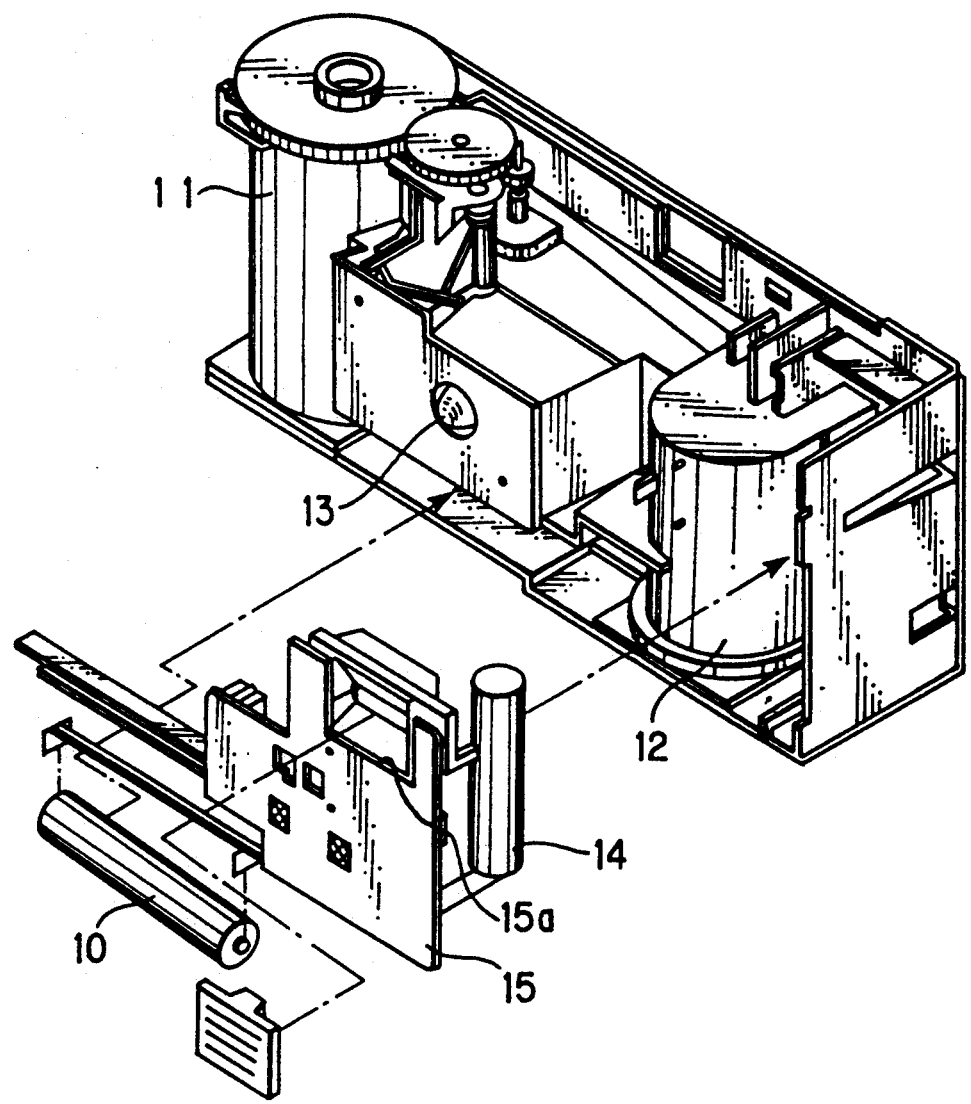
FIG. 5 is an exploded perspective view of a conventional film package, exclusive of the front cover section thereof.

The main body section 20 has a cassette chamber 11 and a film roll chamber 12 disposed on opposite horizontal sides of an exposure frame, which is not shown but is formed in the rear of the main body section 20. As shown in FIG. 4, the cassette chamber 11 holds a film cassette 11a with a spool, whereas the film roll chamber 12 holds a roll of photographic film 12a which is pulled out from the film cassette 11a and wound into a roll at the factory prior to assembly of the film package. The film advancing wheel 22 is mounted on top of the cassette chamber 11, such that the photographic film 12a is wound back into the film cassette 11a by rotating the spool counterclockwise by the film advancing wheel 22, frame by frame as photography proceeds.

A shutter mechanism 26 is disposed between the cassette chamber 11 and the film roll chamber 12 on the left and upper side of a taking lens 13. The shutter mechanism 26 includes a sprocket (now shown) partly protruding from the rear of the main body section 20 and engaging in perforations of the photographic film 12a, an actuating lever 27 and a counter disc 28. The actuating lever 27 is moved upon depression of a shutter button 29, causing a shutter blade to open and then close an exposure aperture, so as to make an exposure.

The main body section 20 has a printed circuit board 30 of a flash unit mounted on the right and front thereof. The printed circuit board 30 is formed with a flash circuit on the rear side thereof, and has a recess 30a in the upper right corner thereof for mounting a light projector 31. An AA-type battery 10 is held by a metal holding member 32 extending in a horizontal direction on the lower left side of the circuit board 30. The terminals of the battery 10 are electrically connected to the flash circuit through the metal holding member 32. A main capacitor 14 of the flash circuit is disposed on the rear side of the circuit board 30 behind the light projector 31. A pair of resilient contact segments 33a and 33b of a synchro-flash switch 33 protrude horizontally from the circuit board 30 and extend parallel to each other toward the shutter mechanism 26.

Figure 3:
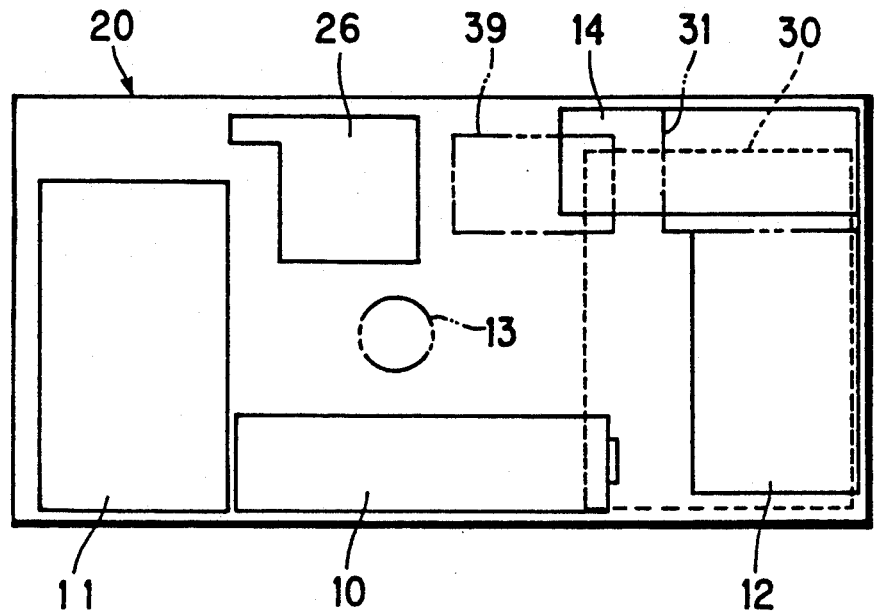
FIG. 3 schematically shows an arrangement of essential internal parts of the film package.

When the circuit board 30 with the above-described elements is mounted on the main body section 20, the main capacitor 14 is disposed above the film roll chamber 12, with its lengthwise direction parallel to the film transport direction, as is shown in FIG. 3. On the other hand, the battery 10 is disposed between the film roll chamber 12 and the cassette chamber 11 below the taking lens 13, with its lengthwise direction also parallel to the film transport direction. Furthermore, in the film package of the present invention, the spacing between the cassette chamber 11 and the film roll chamber 12 is slightly greater than that of the above-described known film package, such that the relatively large main capacitor 14 can be accommodated above the film roll chamber 12. Thereby, the size of the film package is reduced overall.

After mounting the circuit board 30, the front cover section 21 is mounted on the front of the main body section 20 by means of engaging members (not shown) formed integral with these sections 20 and 21. The front cover section 21 is formed with an opening 38 for exposing the taking lens 13, the shutter button 29, a viewfinder front opening 39, and an opening 41 for the light projector 31. An area 43, disposed on the lower right portion of the front wall of the front cover section 21 and surrounded by a channel-shaped slot, forms a resiliently depressible charge switch plate 43. A movable contact segment 44 is mounted on the rear side of the charge switch plate 43. When the charge switch plate 43 is depressed, the movable contact segment 44 electrically connects a pair of stationary contracts 45a and 45b of a charge switch 45 which are formed on the front surface of the circuit board 30. Thereby, the battery 10 is electrically connected to the main capacitor 14, for charging.

Figure 2:
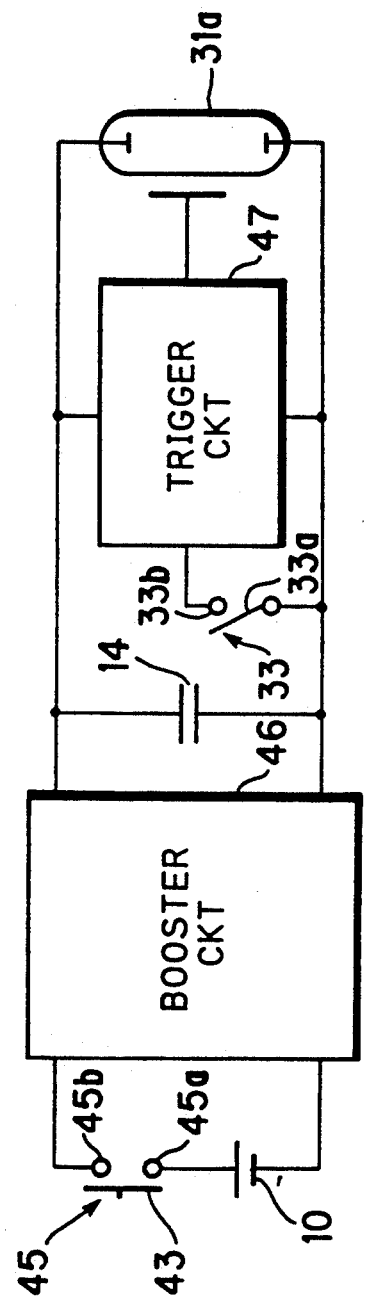
FIG. 2 is the circuitry of the flash unit.

As shown in FIG. 2, the flash circuit includes the battery 10 as the power source, the main capacitor 14, the synchro-flash switch 33, the charge switch 45, a booster circuit 46, a trigger circuit 47, and a discharge tube 31a of the light projector 31. The terminals of the main capacitor 14 are connected to the booster circuit 46. The trigger circuit 47 is connected to the synchro-flash switch 33. The contact segments 33a and 33b are brought into contact with each other by means of the shutter mechanism 26 when the shutter mechanism 26 is released to open the exposure opening. As a result, a synchro-flash signal is outputted from the trigger circuit 47 to the discharge tube 31a. Thus, the light projector 31 flashes in synchronism with the exposure.

It is to be noted that a rear cover section 50 is attached to the rear of the main body section 20, for example by means of engaging members, before attachment of the front cover section 21. The rear cover section 50 has a bottom wall section 51 which is adapted to cover not only the bottom of the main body section 20 but also the whole bottom surface of the film package. The bottom wall section 51 has a lid 52 in an area corresponding to the bottom of the cassette chamber 11. The lid 52 is openable for removing the film cassette 11a from the cassette chamber 11.

As shown in FIG. 4, because the battery 10 is entirely masked by the bottom wall section 51 and the front cover section 21, the battery 10 cannot be removed unless the front cover section 21 is detached from the main body section 20.

The operation of the above-described embodiment will be briefly described.

When the charge switch plate 43 is depressed, the movable contact segment 44 connects the contact pairs 45a and 45b to each other. Thereby, the main capacitor 14 is charged by current supplied from the battery 10. Upon depression of the shutter release button 29 while depressing the charge switch plate 43, the shutter mechanism 26 is released, so that the actuating lever 27 rapidly moves from a cocked position, so as to cause the shutter blade to open the exposure aperture. When the exposure aperture is fully opened, the synchro-flash switch 33 is turned on, so that the capacitor 14 of the trigger circuit 47 is discharged to output a high voltage synchro-flash signal to the discharge tube 31a. Upon emission of the synchro-flash signal, the charge accumulated in the main capacitor 14 is discharged through the discharge tube 31a, so that a flash of light is projected from the light projector 31. It is to be noted that the charging of the flash circuit is terminated when the depression of the charge switch plate 43 is terminated.

After each exposure, the film advancing wheel 22 is rotated counterclockwise to wind up the film 12a by one frame into the film cassette 11a. While the film 12a is advancing by one frame, the sprocket makes one revolution and moves the counter disc 28 by one unit. Simultaneously, the shutter mechanism 26 is cocked. At the same time, the film advancing wheel 22 is locked against further rotation. In this condition, the film package is ready for the next exposure operation. The same operation as set forth above is repeated until all the available frames have been exposed.

After exposure of all the frames, the film package is forwarded to a photofinisher without the need for removal of the exposed film 12a. At the photofinisher, the film cassette 11a containing the exposed film 12a is removed from the cassette chamber 11 through the bottom thereof by opening the lid 52 of the cassette chamber 11, after which development and printing are effected as is conventional. The developed film and finished prints are returned to the customer.

After the removal of the film cassette 11a, the package body is returned for reuse by the manufacturer of the film package. The film package manufacturer removes the circuit board 30 with the battery 10 from the main body section 20, and tests whether the battery 10 should be changed. If necessary, the battery 10 is replaced by a new one, and the circuit board 30 is reused. Therefore, neither the photofinisher nor the customer need remove the battery 10.

Although the present invention has been described in detail above with reference to a preferred embodiment shown in the drawings, various modifications within the scope and spirit of the invention will be apparent to people of ordinary skill in this technological field. For example, the present invention may be applied to a film package wherein the photographic film is wound up frame by frame, from a cassette and, after exposure of all the frames, rewound into the cassette. The present invention may also be applied to a film package using two film cassettes.

Thus, the invention should be considered as limited only by the scope of the appended claims.

What is claimed is:

1. A lens-fitted photographic film package which is pre-loaded with film and has a shutter mechanism and a taking lens, said lens-fitted photographic film package comprising:
    a main body section having said shutter mechanisms, said taking lens, a cassette chamber disposed on one horizontal side of said taking lens, and a film roll chamber disposed on the opposite side of said taking lens from said cassette chamber, said film roll chamber being adapted to contain a roll of said film which is pulled out from a film cassette and wound in a roll, and said cassette chamber containing said film cassette;
    a flash unit including a circuit board mounted in front of said film roll chamber, a main capacitor and a discharge tube for emitting a flash of light, said main capacitor being disposed above said film roll chamber and extending in a horizontal direction;
    a battery for charging said main capacitor, said battery being disposed between said cassette chamber and said film roll chamber and extending in a horizontal direction below said taking lens;
    a front cover section attached to a front of said main body section; and
    a rear cover section attached to a rear of said main body section.

2. A lens-fitted photographic film package as recited in claim 1, wherein said circuit board is substantially rectangular and has a cut-out in an upper right corner thereof for mounting a light projecting section including said discharge tube.

3. A lens-fitted photographic film package as recited in claim 2, wherein said main capacitor is connected to said circuit board and is disposed behind said light projecting section.

4. A lens-fitted photographic film package as recited in claim 1, wherein said battery is an AA-type battery.

5. A lens-fitted photographic film package as recited in claim 1, wherein said battery is connected to said circuit board through a metal holding member which protrudes horizontally from said circuit board below said taking lens.

6. A lens-fitted photographic film package as recited in claim 1, wherein said battery is entirely masked by a bottom wall portion of said rear cover section and said front cover section when said rear cover section and said front cover section are attached to said main body section.

7. A lens-fitted photographic film package as recited in claim 6, wherein said bottom wall portion of said rear cover section has a lid disposed in a bottom of said cassette chamber, said lid being openable so as to remove said film cassette from said cassette chamber.

8. A lens-fitted photographic film package as recited in claim 1, wherein said circuit board includes a charge switch for connecting said battery to said main capacitor, so as to charge said main capacitor, and switch operating means formed in said front cover section for operating said charge switch.

9. A lens-fitted photographic film package as recited in claim 1, wherein said circuit board further includes a synchro-flash switch having a pair of contact segments protruding horizontally from said circuit board toward said shutter mechanism, and synchro-flash switch being turned on by said shutter mechanism moving said contact segments into contact with each other when said shutter mechanism is released.

10. A lens-fitted photographic film package as recited in claim 1, wherein said film roll chamber contains a roll of unexposed film previously pulled out from said film cassette.

11. A lens-fitted photographic film package which is pre-loaded with film and has a shutter mechanism and a taking lens, said lens-fitted photographic film package comprising:
    a cassette chamber for containing a film cassette and disposed on one horizontal side of said taking lens;
    a film roll chamber for containing a roll of said film pulled out from said film cassette and wound in a roll, said film roll chamber being disposed on the opposite side of said taking lens from said cassette chamber;
    a flash unit including a main capacitor and a discharge tube for emitting a flash of light, said main capacitor being disposed above said film roll chamber and extending in a horizontal direction; and
    a battery for charging said main capacitor, said battery being disposed between said cassette chamber and said film roll chamber and extending in a horizontal direction below said taking lens.

12. A lens-fitted photographic film package as recited in claim 11, wherein said flash unit further includes a circuit board having a cut-out, and wherein a light projecting section including said discharge tube is mounted in said cut-out, and said main capacitor is mounted on a rear side of said circuit board.

13. A lens-fitted photographic film package as recited in claim 11, wherein said film roll chamber contains a roll of unexposed film previously pulled out from said film cassette.

* * * * *